US008665881B2

(12) United States Patent
Lee et al.

(10) Patent No.: US 8,665,881 B2
(45) Date of Patent: *Mar. 4, 2014

(54) SCHEDULING WITH QUALITY OF SERVICES, MULTIUSER DIVERSITY GAIN, AND FAIRNESS IN WIRELESS NETWORKS

(71) Applicant: Cellco Partnership D/B/A Verizon Wireless, Basking Ridge, NJ (US)

(72) Inventors: Jay J. Lee, San Ramon, CA (US); Taher Farkhondeh, Danville, CA (US); Yee Sin Chan, San Jose, CA (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/653,064

(22) Filed: Oct. 16, 2012

(65) Prior Publication Data

US 2013/0040681 A1 Feb. 14, 2013

Related U.S. Application Data

(63) Continuation of application No. 12/121,333, filed on May 15, 2008, now Pat. No. 8,345,691.

(51) Int. Cl.
*H04L 12/28* (2006.01)
*H04L 12/56* (2011.01)
*H04B 7/00* (2006.01)

(52) U.S. Cl.
USPC ............. 370/395.4; 370/395.41; 370/395.42; 455/509; 455/512; 455/513

(58) Field of Classification Search
USPC ............. 370/395.4, 395.41, 395.42; 455/509, 455/512, 513
See application file for complete search history.

(56) References Cited

U.S. PATENT DOCUMENTS

| | | | |
|---|---|---|---|
| 6,449,490 B1 | 9/2002 | Chaponniere et al. | |
| 6,728,233 B1 * | 4/2004 | Park et al. ...................... | 370/342 |
| 6,747,976 B1 | 6/2004 | Bensaou et al. | |
| 6,909,879 B1 | 6/2005 | Centore, III | |
| 6,996,374 B1 | 2/2006 | Bao et al. | |
| 7,190,674 B2 | 3/2007 | Kobayakawa et al. | |
| 7,463,631 B2 | 12/2008 | Bao et al. | |

(Continued)

FOREIGN PATENT DOCUMENTS

WO 03/039085 5/2003

OTHER PUBLICATIONS

"Quality of service," Wikipedia, Retrieved on Mar. 5, 2008 from http://en.wikipedia.org/wiki/Quality_of_service, 8 pages.

(Continued)

*Primary Examiner* — Farah Faroul

(57) ABSTRACT

Systems and methods for scheduling wireless communications of a base station with multiple user mobile stations involve grouping the user mobile stations in clusters based on a predetermined criterion, such as a QoS profile of a user mobile station. Each cluster is assigned with a cluster weight factor that defines a priority level of the cluster. For each user mobile station in each cluster, a priority index may be determined based on the cluster weight factor of a respective cluster, and throughput and fairness factors respectively selected to maximize throughput and provide fairness to user mobile stations. The user mobile stations may be served in an order based on their priority indexes.

18 Claims, 3 Drawing Sheets

(56) References Cited

U.S. PATENT DOCUMENTS

| | | | |
|---|---|---|---|
| 7,474,642 B1* | 1/2009 | Chheda | 370/329 |
| 7,502,317 B2 | 3/2009 | Joshi et al. | |
| 7,694,158 B2 | 4/2010 | Melpignano et al. | |
| 2003/0037150 A1 | 2/2003 | Nakagawa | |
| 2003/0123425 A1 | 7/2003 | Walton et al. | |
| 2003/0133457 A1 | 7/2003 | Ono et al. | |
| 2003/0214951 A1 | 11/2003 | Joshi et al. | |
| 2004/0082364 A1 | 4/2004 | Kitazawa et al. | |
| 2005/0083960 A1 | 4/2005 | Gutierrez et al. | |
| 2006/0040674 A1 | 2/2006 | Vannithamby et al. | |
| 2006/0067269 A1 | 3/2006 | Jugl et al. | |
| 2007/0041364 A1 | 2/2007 | Kakadia | |
| 2007/0070894 A1 | 3/2007 | Wang et al. | |
| 2007/0104099 A1 | 5/2007 | Mutnuru et al. | |
| 2009/0059860 A1* | 3/2009 | Maltsev et al. | 370/330 |
| 2009/0110087 A1* | 4/2009 | Liu et al. | 375/260 |
| 2009/0129502 A1* | 5/2009 | Tong et al. | 375/299 |
| 2009/0285219 A1 | 11/2009 | Romrell et al. | |

OTHER PUBLICATIONS

"Differentiated services," Wikipedia, Retrieved on Mar. 5, 2008 from http://en.wikipedia.org/wiki/Differentiated_services, 7 pages.

International Search Report and the Written Opinion of the International Searching Authority issued in International Patent Application No. PCT/US2009/044020 dated Jul. 9, 2009.

Holtzman, Jack M. et al., "Asymptotic Analysis of Proportional Fair Algorithm," Qualcomm, Inc., IEEE 2001, pp, F-33-F37.

Kim, Sang Wu et al., "Truncated Power Control in Code Division Multiple Access Communications," Korea Advanced Institute of Science and Technology, IEEE 1997, pp. 1488-1493.

Knopp, R. et al., "Multiple-Accessing over Frequency-Selective Fading Channels," Mobile Communications Group, IEEE 1995, pp. 1326-1330.

Etemad, Kamran, "CDMA2000 Evolution," Wiley-Interscience, Chapter 4 New Concepts and Technologies in CDMA2000, pp. 76-78.

Wang, Jiangzhou (editor) & Ng, Tung-Sang (editor), "CDMA2000 High-Rate Packet Data System," Advances in 3G Enhanced Technologies for Wireless Communications, Artech House, Incorporated, 2002, pp. 149, 214-223.

Entire Prosecution of U.S. Appl. No. 12/121,333 to Lee et al. entitled "Scheduling With Quality of Service Support in Wireless System".

* cited by examiner

SCHEDULING WITH QUALITY OF SERVICES, MULTIUSER DIVERSITY GAIN, AND FAIRNESS IN WIRELESS NETWORKS

CROSS-REFERENCE TO RELATED APPLICATION

This application is a continuation of and claims priority to U.S. patent application Ser. No. 12/121,333, filed on May 15, 2008, the entire content of which is incorporated herein by reference.

BACKGROUND

In recent years, mobile wireless communications have become increasingly popular. Today's wireless network architecture is evolving from a circuit-switched, voice-centric architecture towards an IP-based architecture supporting voice, video, and data services. A wireless communication network includes a wireless sector in which a base station communicates with a group of user mobile stations over a shared frequency channel. In this model, the traffic data can be buffered at the transmitter side and sent to the target user based on a scheduling algorithm. The process of determining which user mobile station is allowed to transmit information is referred to as "scheduling". In a time-division multiplexing access (TDMA) system, for example, each user mobile station may be assigned with a timeslot during which it may communicate with the base station. There are multiple users with different and time-varying channel conditions at any given time. Each user periodically or continually measure channel gain or Carrier-to-Interference (C/I) ratio and reports that as a channel feedback to the transmitter. In some systems, the user mobile station may estimate their achievable data rate and then send that as their requested data rate instead of sending measured C/I. The packet scheduler at the transmitter side takes the channel feedback from all user mobile stations into account in making decisions as to which user to be served.

In a wireless system serving a large number of randomly distributed user mobile stations, the long-term system throughput can be maximized using a scheduling technique that provides priority for the user mobile station with the best channel condition or the highest requested data rate at the time of transmission. This scheduling technique illustrated in FIG. 1 can achieve a performance gain (referred to as a multi-user diversity gain) of 50% to 100%.

As shown in FIG. 1, a base station 10 may provide wireless communications with multiple user mobile stations U1, U2, . . . , Un. The base station 10 may include a radio resource controller 12 that performs radio resource management operations to support multiple user mobile stations sharing a common frequency channel. The radio resource management operations may involve controlling parameters such as transmit power, channel allocation, handover criteria, modulation scheme, error coding scheme, etc. The radio resource controller 12 enables the base station 10 operating in a multi-user environment to utilize the limited radio spectrum resources and radio network infrastructure as efficiently as possible.

The radio resource controller 12 interacts with a scheduler 14 that allocates available bandwidth among user mobile stations in a particular order. For example, FIG. 1 shows a scheduling order of user mobile stations that request the radio resource controller 12 to provide transmission. The base station 10 may have a buffer memory 16 containing a user buffer for each user mobile station U1, U2, . . . , Un. Each user buffer accumulates packets in a data queue to be transmitted to a respective user mobile station. The scheduler selects one or more packets in turn from each user queue, in accord with its scheduling algorithm, and the selected packets are transmitted over the air to the mobile station in the order selected by the scheduler 14.

The user mobile stations may experience different and time-varying channel conditions at any given time. To monitor channel conditions, each user mobile station may periodically measure the channel gain or Carrier-to-Interference (C/I) ratio, and report it to the radio resource controller 12 as a channel feedback. Instead of sending the C/I ratio, the user mobile station may estimate its date rate achievable based on current channel conditions and send it to the radio resource controller 12 as the requested data rate. The scheduler 14 may make a scheduling decision based on bandwidth allocation for user mobile stations and/or based on their channel feedbacks.

To maximize the throughput or the multi-user gain, the scheduler 14 may give priority to the user mobile station with the best channel condition or to the station that requests the highest data rate. This scheduling technique is called the best rate (BR) scheduling. While the BR scheduling maximizes the sector throughput, it does not provide any fairness to user mobile stations with relatively poor channel conditions, since these user mobile stations have to wait for a long time before they are served. For example, the BR scheduling is unfair to user mobile stations located at larger distances from the base station 10.

To maximize the fairness, the round-robin (RR) scheduling technique may be used. The RR scheduling gives an equal number of time slots to each user mobile station in a round-robin fashion, regardless of channel conditions. While this scheduling method provides fairness, the throughput or multi-user diversity gain may be significantly reduced.

To balance the throughput and fairness requirements, a Proportional Fairness (PF) scheduling algorithm is implemented in some cellular networks. This algorithm involves monitoring the average throughput of each user mobile station, and raising the priority of a user mobile station when its traffic is not transmitted for a long time or its average throughput is lower than the average throughput of other stations.

The PF algorithm computes a PF index as a ratio of the user's channel condition to the user's average received data rate. This ratio represents a combination of a channel condition and a queuing time period for each user. For a user mobile station with a good channel condition, the PF index (i.e. priority) may be lower than that for a station with a poor channel condition, if the station with a good channel condition has been receiving data more frequently (i.e. its average received data rate is higher). Conversely, a user mobile station with a poor channel condition may receive higher PF index (or higher priority), if its average received data rate is lower.

For each user mobile station, the PF algorithm computes a ratio of channel gain CIR (i) to the average received data $\overline{R}(i)$ at the ith time window:

$$I(i) = \frac{CIR(i)}{\overline{R}(i)} \qquad (1)$$

The average received data, $\overline{R}(i)$, is computed by the weighted moving average:

$$\overline{R}(i) = (1-w) \cdot \overline{R}(i-1) + w \cdot R(i) \qquad (2)$$

where R(i) is the received data rate (set to zero for all user mobile stations which are not served in the current ith window). In equation (2), the weight w should be small to smooth out any abrupt temporary fluctuations in the current window. Thus, the PF scheduler keeps track of the weighted moving average of each user's received data rate, computes the ratio of channel gain to the weighted moving average, and uses this normalized ratio as the criterion for the scheduling. The user with the highest I(i) will be served at the ith time window.

While the PF scheduling algorithm has been effective in providing a good compromise between throughput and fairness, this algorithm does not support Quality-of-Service (QoS) control which enables a network provider to assign different priority to different applications, users, or data flows, or to guarantee a certain level of performance to a certain data flow or user. For example, a QoS mechanism may guarantee a required bit rate, delay, jitter, packet dropping probability and/or bit error rate. Quality of service guarantees are important if the network capacity is insufficient, especially for real-time streaming multimedia applications such as voice over Internet Protocol (IP) and IP television, since these applications often require strict end-to-end delay and delay variation (or jitter). QoS control is very important in wireless data networks where the capacity is a limited resource. For example, QoS is a critical component in the third generation (3G) and fourth generation (4G) wireless networks that need to support real-time voice and video applications.

In particular, wireless networks may be required to provide Differentiated Services (DS) for user traffic. For example, Differentiated Services may be used to provide high-level guaranties of low-latency service to critical network traffic, such as voice or video, while providing lower-level best-effort traffic guarantees to non-critical services such as web traffic or file transfer. Also, Differentiated Services may be utilized to provide a higher level of service for premium users.

The PF scheduling algorithm and its variations do not support user-specific or application-specific QoS. This scheduling technique is based only on signal strength and fairness and does not allow wireless network providers to meet QoS or Differentiated Services requirements. For example, a wireless network provider may need to assign higher priorities to premium user mobile stations or stations implementing real-time applications. However, in accordance with the PF scheduling, premium user mobile stations or user mobile stations implementing real-time applications cannot obtain higher priorities. Instead, they may have to wait for service longer than non-premium user mobile stations, for example, if premium user mobile stations are located farther from the base station than non-premium user mobile stations with the same average data rate.

Some known scheduling techniques, such as weighted fair queuing (WFQ) and weighted round robin (WRR)/Deficit Round Robin (DRR) scheduling are specifically designed to provide fairness, differentiated services and QoS by assigning appropriate weights to each user queue. However, these scheduling techniques are not able to provide a multi-user diversity gain. Therefore, they can not increase the system throughput.

Hence, there is a need for a flexible scheduling technique capable of providing QoS control and differentiated services, while maintaining a balance between the system throughput and fairness to users.

BRIEF DESCRIPTION OF THE DRAWINGS

The drawing figures depict concepts by way of example, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, the present teachings may be practiced without such details. In other instances, methods, procedures, components, and circuitry have been described at a relatively high-level, without detail, in order to avoid unnecessarily obscuring aspects of the present teachings.

The present disclosure will be made using the example of a scheduling technique for a base station that communicates with multiple user mobile stations in a wireless network. However, the disclosed scheduling mechanism is applicable for scheduling any traffic in a multi-user environment. For example, it may be utilized in an access point of a wireless local area network to schedule communications with various network devices.

Figure 1:
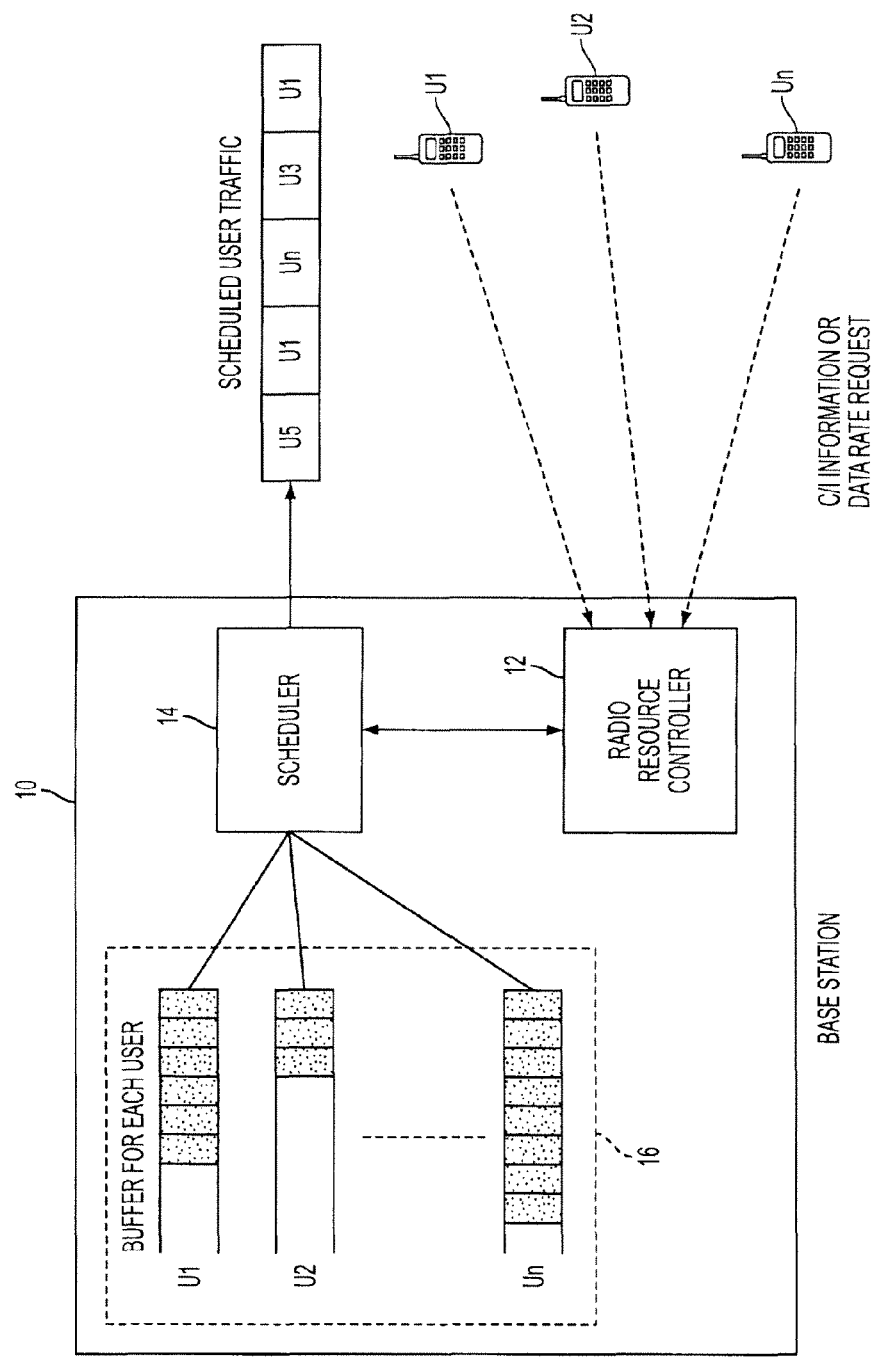
FIG. 1 illustrates regular wireless communications between a base station and multiple user mobile stations.
Figure 2:
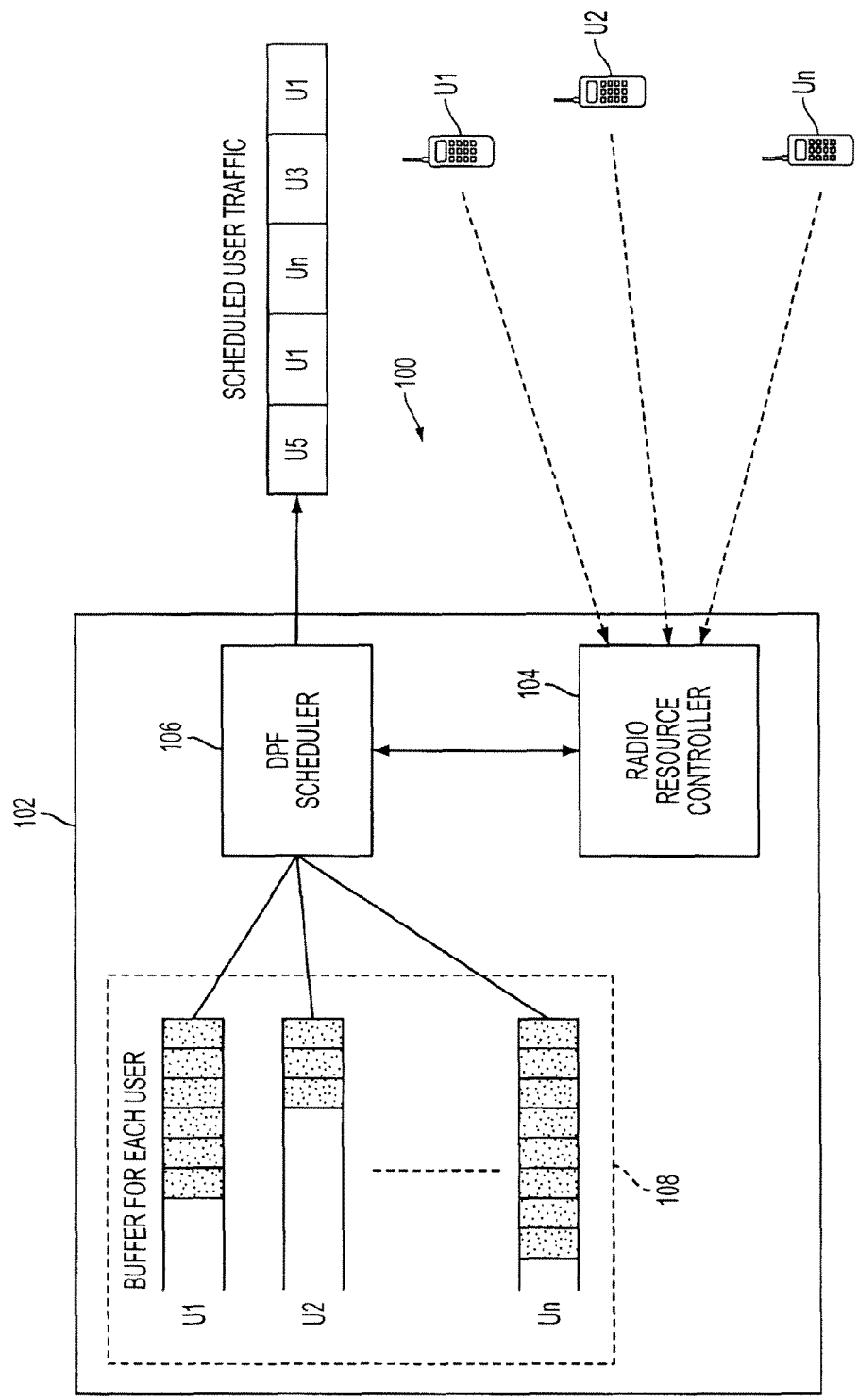
FIG. 2 is a block diagram of an exemplary wireless system, in which communications with user mobile stations are scheduled using a scheduling technique of the present disclosure.

FIG. 2 illustrates an exemplary wireless network 100, in which a base station 102 provides wireless communicates with multiple user mobile stations U1, U2, . . . , Un. The base station 102 includes a radio resource controller 104 that performs radio resource management operations to support multiple user mobile stations U1, U2, . . . , Un sharing a common frequency bandwidth assigned to the base station 102. The radio resource controller 104 may control such radio resource parameters as transmit power, channel allocation, handover criteria, modulation scheme, error coding scheme, etc.

A Differentiated Proportional Fairness (DPF) scheduler 106 of the present disclosure interacts with the radio resource controller 104 to allocate the common frequency bandwidth to a particular user mobile station in a particular time slot. For example, the DPF scheduler 106 may produce a user traffic schedule defining an order in which user mobile stations U1, U2, . . . , Un communicate with the base station 102. FIG. 2 shows an example of the user traffic schedule formed by the DPF scheduler 106 for transmission of packets from the base station 102 over the airlink to the mobile stations. The base station 102 may have a buffer memory 108 containing a user buffer for each user mobile station U1, U2, . . . , Un. Each user buffer accumulates a queue of packets of data to be transmitted to a respective user mobile station.

The user mobile stations U1, U2, . . . , Un may periodically determine conditions of radio channels between the base station 102 and the respective user mobile stations. For example, the user mobile stations U1, U2, . . . , Un may measure the channel gains or Carrier-to-Interference (C/I) ratios, and report these parameters to the radio resource controller 104 as a channel feedback. Instead of sending the C/I ratio, the user mobile station may estimate its achievable date rate at current radio channel conditions and send to the radio resource controller 104 a request for a particular data rate determined based on the channel conditions. As one skilled in the art would realize, any parameter reflecting channel conditions may be determined by a user mobile station and reported to the base station 102.

Alternatively, channel condition parameters may be determined using monitoring devices arranged outside user mobile stations U1, U2, . . . , Un. For example, radio propagation conditions in a particular wireless sector may be monitored using radio beacons arranged in particular locations. As described in more detail below, the DPF scheduler 106 uses parameters defining conditions of radio channels in its decision on frequency bandwidth allocation for the respective user mobile stations.

Figure 3:
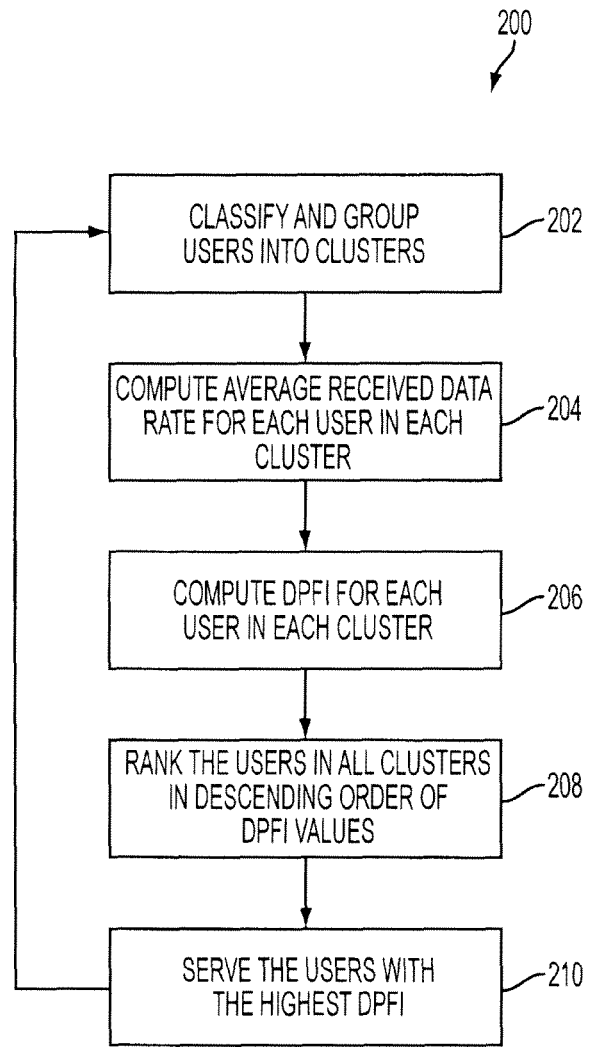
FIG. 3 is a flow chart illustrating an exemplary scheduling procedure of the present disclosure.

FIG. 3 is a flow chart illustrating an exemplary DPF scheduling procedure 200 employed by the DPF scheduler 106. For example, the DPF scheduling procedure 200 may be implemented using a program encoded into memory media of a data processing device, such as a general-purpose computing device operating as part of the base station 102. Alternatively, the DPF scheduling procedure 200 may be implemented by a scheduling device including specifically engineered chips having logic circuits and other components for performing DPF scheduling operations described below.

The DPF scheduling procedure 200 includes classification of the user mobile stations U1, U2, . . . , Un and grouping them into particular clusters based on this classification (block 202). The user mobile stations U1, U2, . . . , Un may be classified using any classification criteria established by a wireless network provider. For example, the classification may be performed based on Quality of Service (QoS) levels or Differentiated Services (DS) classes supported by a particular wireless network.

In particular, a wireless network may employ a QoS mechanism that defines a desired number of QoS priority levels for different types of user traffic. For example, the lowest QoS priority level may correspond to best-effort traffic guaranties given to non-critical data, such as web traffic or file transfer. The next QoS priority level may be assigned to critical business traffic. Streaming multimedia, such as voice and video, may have a higher QoS priority level than the critical business traffic. Interactive voice and video may have even higher QoS priority level. The highest QoS levels may be assigned to Layer 2 and Layer 3 network control traffic.

The QoS priority levels may be encoded in data packets transferred over the network. An IP packet header includes an 8-bit Differentiated Services (DS) field, the two bits of which are Explicit Congestion Notification (ECN) bits. The remaining 6 DS bits enables a network provider to define potentially up to $2^6$ different DS classes representing various QoS priority levels. These QoS priority levels may be specified using information from various network parameters, such as source IP addresses, destination IP addresses, source port numbers, destination port numbers, packet lengths, source or destination MAC addresses, applications based on port numbers, etc.

The DPF scheduler 106 may classify the user mobile stations U1, U2, . . . , Un based on any QoS levels or DS classes defined in the wireless network 100. For example, the DPF scheduler 106 may group the user mobile stations U1, U2, . . . , Un into m clusters, where m may correspond to the number of QoS levels or DS classes in the wireless network 100. Each cluster j may be given a cluster weight $\alpha_j$, where j=1, 2, . . . , m. A cluster corresponding to a higher QoS priority level may receive a higher cluster weight, where $$\sum_{j=1}^{m} \alpha_j = 1.$$

The cluster weights may be used to allocate the total available bandwidth among the clusters so as to provide more bandwidth to clusters with higher QoS priority levels.

At a particular time window i of a communication session between the base station 102 and the user mobile stations U1, U2, . . . , Un, the DPF scheduler 106 may compute a fairness factor that supports fair access of the user mobile stations U1, U2, . . . , Un to a common bandwidth (block 204). For example, the fairness factor may correspond to the weighted moving average of received data rate for each user mobile station. At the ith time window, for each user mobile station k in cluster j, the weighted moving average of received data rate may be computed as:

$$\overline{R}_{jk}(i) = (1-w) \cdot \overline{R}_{jk}(i-1) + w \cdot R_{jk}(i) \tag{3}$$

where $R_{jk}(i)$ is the user station's current received data rate (set to zero for all user mobile stations not served in the current ith window), and w is a pre-set weight of the received data rate.

In order to reduce temporary data rate fluctuations in the current time window, the weight w may be set to a small value. In particular, a small value of w gives less importance to the most recent received data rate, thus smoothing out any unusual increase in the current data rate of the user mobile station. A larger value of w, on the other hand, would give more importance to the most recent data rate of the user mobile station.

In block 206, for each user mobile station k in each cluster j, the DPF scheduler 106 may determine a Differentiated Proportional Fairness Index (DPFI) at time window i as follows:

$$DPFI_{jk}(i) = (\alpha_j)^\gamma \cdot \frac{REQ_{jk}(i)}{\overline{R}_{jk}(i)}, \tag{4}$$

where all user mobile stations in a particular cluster j may be weighted by a cluster weight $\alpha_j$ selected based on the QoS priority level for the cluster j, $\gamma$ is a cluster weight coefficient, and $REQ_{jk}(i)$ is a throughput factor for user mobile station k in cluster j at time window i.

Cluster weight coefficient $\gamma$ may serve to control an operation mode of the DPF scheduler 106. For example, when $\gamma=1$, the DPF scheduler 106 provides differentiation between the clusters of user mobile stations based on QoS priority levels. If $\gamma=0$, the DPF scheduler 106 may operate as a PF scheduler.

The throughput factor $REQ_{jk}(i)$ may be any parameter used by the DPF scheduler 106 to maximize the throughput of a wireless sector including the base station 102 and the respective user mobile stations. In particular, the throughput factor may indicate a condition of a channel between the base station 102 and the user mobile station k in the cluster j during time window i. For example, the throughput factor may correspond to the channel gain or C/I ratio determined by the respective user mobile station. Alternatively, the throughput factor may correspond to the data rate requested by the user mobile station based on the estimate of the data rate achievable at current channel conditions.

In block 208, the DPF scheduler 106 may rank all user mobile stations k in the order of their $DPFI_{jk}$ values. For example, the user mobile stations may be ranked in the descending order, from the highest $DPFI_{jk}$ value to the lowest $DPFI_{jk}$ value. Although the ranking of user mobile stations depend on their cluster (or cluster weight factors), higher cluster weight factors do not guarantee a higher scheduling order. For example, a user mobile station in cluster k may be ranked below another user mobile station in cluster k−1, even though cluster k has a higher cluster weight factor than cluster k−1, because the DPF scheduler 106 takes into consideration other factors such as throughput and fairness.

In block 210, the DPF scheduler 106 instructs the radio resource controller 104 to serve user mobile station k having the highest $DPFI_{jk}$ value at time window i. Thereafter, the DPF scheduler repeats the steps 202-210 for the next time window i+1.

A numerical example presented below illustrates the DPF scheduling procedure 200 for 12 user mobile stations U1, U2, U3, . . . , U12 communicating with a base station. Table 1 shows Proportional Fairness (PF) index values for user mobile stations U1, U2, . . . , U12, and the order in which these user mobile stations would be served in accordance with a regular PF scheduling procedure. The PF index values are determined based on signal strength and average received data rate, without taking into account any QoS considerations. As indicated in Table 1, a regular PF scheduling procedure would request the radio resource controller 104 to serve the user mobile stations U1, U2, U3, . . . , Un in the order of their PF index values.

In particular, user mobile station U7 having the highest PF index value would be served first, followed by user mobile stations U12 and U4 having the next highest PF index values.

TABLE 1

Exemplary scheduling by PF algorithm

| User mobile stations | PF Index Values | PF Scheduling Order |
|---|---|---|
| U1 | 17.1 | 8 |
| U2 | 10.0 | 11 |
| U3 | 18.5 | 6 |
| U4 | 20.3 | 3 |
| U5 | 19.9 | 4 |
| U6 | 18.0 | 7 |
| U7 | 22.2 | 1 |
| U8 | 15.1 | 10 |
| U9 | 9.80 | 12 |
| U10 | 15.8 | 9 |
| U11 | 18.6 | 5 |
| U12 | 20.5 | 2 |

As discussed above, the DPF scheduling procedure of the present disclosure supports a QoS priority mechanism implemented in a wireless network. For example, the wireless network 100 may have three QoS priority levels—high, medium and low. If the Differentiated Services are provided in the network 100, high, medium and low QoS priority levels may correspond to DS classes provided based on the following DS behavior groups: Expedited Forwarding (EF), Assured Forwarding (AF) and Default Forwarding (DF), respectively.

The Expedited Forwarding group is defined in Request for Comment (RFC) 3246 of Internet Engineering Task Force (IETF). This group is suitable for voice, video and other real-time services provides low delay, low loss and low jitter. The Assured Forwarding group defined in IETF RFC 2597 provides assurance of delivery as long as the traffic does not exceed some subscribed rate. Traffic that exceeds the subscribed rate faces a higher probability of being dropped if congestion occurs. The Default Forwarding group corresponds to best-effort traffic that does not meet the requirements of any of the other defined classes.

For example, high, medium and low QoS priority levels may be respectively set by the following cluster weights: 0.6 (60%), 0.3 (30%) and 0.1 (10%). Hence, the high priority DS class is allocated with 60% of the total communication time, the medium priority DS class is allocated with 30% of the total communication time, and the low priority DS class is allocated with 10% of the total communication time. For example, user mobile stations U1, U2, U3, . . . , U12 may be classified into the DS classes in the following manner:
Class 1 (EF): U1, U2, U7, U11;
Class 2 (AF): U3, U4, U9; and
Class 3 (DF): U5, U6, U8, U10, U12.

In a wireless network having QoS requirements, the regular PF scheduling procedure illustrated in Table 1 becomes unacceptable. For example, the PF scheduling procedure does not give a proper treatment to user mobile stations U1, U2 and U11 of the highest QoS priority class (they are served 8th, 11th and 5th, respectively). User mobile station U9 of the medium QoS priority class is served the last, while user mobile stations U5, U6, U8, U10 and U12 of the lowest QoS priority class are served earlier than U9.

The DPF scheduling procedure 200 of the present disclosure addresses QoS network requirements by serving user mobile stations based on their DPFI values. Table 2 illustrates exemplary DPFI values and respective scheduling order for user mobile stations grouped by QoS priority levels. For classes 1, 2 and 3 with high, medium and low QoS priority levels, respectively, the DPFI values are computed based on the following cluster weights $\alpha_j$: 60%, 30% and 10%.

TABLE 2

Exemplary scheduling by DPF algorithm

| User mobile stations | DPFI Values | DPF Scheduling Order |
|---|---|---|
| Class 1 (High) | | |
| U1 | 10.26 | 3 |
| U2 | 6.00 | 5 |
| U7 | 13.32 | 1 |
| U11 | 11.16 | 2 |
| Class 2 (Med.) | | |
| U3 | 5.55 | 6 |
| U4 | 6.09 | 4 |
| U9 | 2.94 | 7 |
| Class 3 (Low) | | |
| U5 | 1.99 | 9 |
| U6 | 1.80 | 10 |
| U8 | 1.51 | 12 |
| U10 | 1.58 | 11 |
| U12 | 2.05 | 8 |

The DPFI values in all classes are ranked in the descending order—from the highest DPFI value to the lowest DPFI value. The user mobile stations are served in the order of their DPFI values starting with the highest. It is noted that the DPFI ranking reflects the QoS priority level of the respective class. However, a user mobile station of a class with a higher QoS priority level does not necessarily has its DPFI value higher than the DPFI value of another mobile station that belongs to a class with a lower QoS priority level. Fairness and throughput factors are also taken into consideration when the DPFI is determined. Therefore, a user mobile station of a lower QoS level may be served before a user mobile station of a higher QoS level. For example, user mobile station U4 of class 2 is served before user mobile station U2 of class 1.

Table 2 shows that the DPFI scheduling technique of the present disclosure provides an acceptable balance among QoS, throughput and fairness requirements. For example, it provides a higher priority service for user mobile stations of class 1 with a high QoS priority level, except for user mobile station U2 that may have a poor channel condition or a high average received data rate. User mobile station U4 of class 2 with a medium QoS priority level is served after user mobile stations U7, U11 and U1 of class 1, whereas user mobile stations U3 and U9 of the class 2 are served after user mobile station U2 of class 1. User mobile stations of class 3 with a low QoS priority level are served the last.

It is noted that the scheduling order depends upon cluster weights $\alpha_j$. For example, to avoid serving user mobile station U2 of the class having a high QoS priority level after user mobile station U4 of the class having a medium QoS priority level, the cluster weight for the high QoS level class may be set higher than 60%, as shown in the example in Table 2. For example, cluster weights may be set based on a desired relative QoS priority for each class, and the importance of throughput and fairness factors.

Hence, the DPF scheduling technique of the present disclosure enables a wireless network provider to control user traffic based on QoS requirements, while maintaining a desired balance between throughput and fairness requirements.

While the foregoing has described what are considered to be the best mode and/or other preferred examples, it is understood that various modifications may be made therein and that the invention or inventions disclosed herein may be implemented in various forms and examples, and that they may be applied in numerous applications, only some of which have been described herein. It is intended by the following claims to claim any and all applications, modifications and variations that fall within the true scope of the present teachings.

What is claimed is:

1. An article of manufacture comprising:
   a non-transitory machine readable storage medium of a data processing system; and
   programming encoded in the storage medium, the programming causing the data processing system to perform a scheduling procedure for wireless communications of a base station with multiple mobile stations, the scheduling procedure comprising:
   grouping mobile stations into clusters based on a classification parameter, determining an index for each mobile station in each cluster, the index being determined based on a combination of a weight factor of the respective cluster and a condition of a communication channel between the respective mobile station and the base station,
   wherein the condition of the communication channel is determined based on a throughput factor of the mobile station; and
   ranking the mobile stations in an order based on determined indexes,
   wherein the determined index for a particular mobile station corresponds to a combination of the cluster weight factor and a ratio of the throughput factor to a weighted moving average of a received data rate for the particular mobile station.

2. The article of claim 1, wherein the index of a mobile station is further determined based on a fairness factor indicative of an average data amount received by the mobile station in a predetermined time period.

3. The article of claim 2, wherein the fairness factor corresponds to a weighted moving average of a received data rate for the mobile station.

4. The article of claim 1, wherein the grouping of the mobile stations in the clusters is based on quality of service (QoS) levels assigned to the mobile stations.

5. The article of claim 4, wherein the cluster weight factor of each cluster corresponds to the QoS level of the mobile stations in the cluster.

6. The article of claim 1, wherein the grouping of the mobile stations in the clusters is based on Differentiated Services (DS) classes assigned to the mobile stations.

7. The article of claim 6, wherein the cluster weight factor of each cluster corresponds to the DS class of the mobile stations in the cluster.

8. The article of claim 1, wherein the index of a mobile station is proportional to the cluster weight factor of the respective cluster.

9. The article of claim 1, wherein the throughput factor of the user mobile station is determined based on a data rate requested by the mobile station.

10. A station for providing wireless communications with multiple user devices, comprising:
    a scheduler for determining an order of communications of the station with the user devices, the scheduler being configured to:
    classify the user devices into clusters having various priority levels, the clusters including a first cluster having a first priority level and a second cluster having a second priority level higher than the first priority level, and
    determining an order of communication for a user device based on a combination of a cluster factor indicating a priority level of a cluster and an additional factor selected to allow a first user device in the first cluster to perform communications before a second user device in the second cluster,
    wherein the additional factor is a ratio of a condition of the communication channel to a weighted moving average of a received data rate for the particular user device.

11. The station of claim 10, wherein the additional factor is determined based on a condition of a communication channel between the user device and the station.

12. The station of claim 11, wherein the condition of the communication channel is determined based on a Carrier-to-Interferences (C/I) ratio of the communication channel between the station and the user device.

13. The station of claim 11, wherein the additional factor is further determined based on a fairness factor selected to provide fair access for each user device to communication resources.

14. The station of claim 13, wherein the fairness factor is selected based on an average data amount received by the user device in a predetermined time period.

15. The station of claim 10, wherein the user devices are classified into the clusters based on Quality of Service (QoS) levels.

16. The station of claim 10, wherein the user devices are classified into the clusters based on Differentiated Services (DS) classes.

17. The station of claim 10, wherein the order of communication for the user device is determined based on a combination of a weighted factor of the cluster and the additional factor determined based on a condition of a communication channel between the user device and the station.

18. The station of claim 10, wherein the order of communication for the user device is determined based on a combination of a weighted factor of the cluster and the additional factor determined based on a fairness factor selected to provide fair access of each user device to communication resources.

* * * * *